United States Patent Office 3,555,037
Patented Jan. 12, 1971

3,555,037
CERTAIN 5,6,7,8-TETRAHYDRO-β-CARBOLINES
William Alan Remers, Suffern, N.Y., and Martin Joseph
 Weiss, Oradell, N.J., assignors to American Cyanamid
 Company, Stamford, Conn., a corporation of Maine
No Drawing. Continuation-in-part of application Ser. No.
 823,480, May 9, 1969, which is a continuation-in-part
 of application Ser. No. 588,317, Oct. 21, 1966. This
 application Dec. 5, 1969, Ser. No. 882,732
Int. Cl. C07d 31/42
U.S. Cl. 260—296                                                3 Claims

ABSTRACT OF THE DISCLOSURE

The preparation of keto-1-lower alkyl-5,6,7,8-β-carbolines from 5,8-dihydromethoxy-1-lower alkyl β-carbolines by treatment with a mineral acid, is described. These compounds are physiologically active as antidepressants.

---

This application is a continuation-in-part of our application Ser. No. 823,480, filed May 9, 1969 now abandoned, which in turn is a continuation-in-part of application Ser. No. 588,317, filed Oct. 21, 1966, now U.S. Pat. 3,455,943.

DESCRIPTION OF THE INVENTION

This invention relates to new organic compounds. More particularly, the invention is concerned with novel substituted 5,6,7,8-tetrahydro-β-carbolines as represented by the following formula:

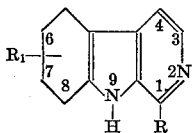

wherein R is lower alkyl and $R_1$ is the oxygen of a keto group. The lower alkyl radicals may be, for example, ethyl, propyl, isopropyl or butyl.

The compounds of this invention are in general, white crystalline compounds, insoluble in water, and soluble in the more common organic solvents, as for example, alcohols and acetone. The non-toxic acid addition salts of the present compounds are readily prepared by well-known methods and are soluble in water.

The novel compounds of this invention may be prepared by the reduction of the corresponding β-carbolines with an alkali metal such as lithium and an alcohol such as methanol in liquid ammonia. The following equation is illustrative of the process when specifically applied to 7-methoxy-1-methyl-β-carbolines, known also as harmine, to produce 5,8-dihydro-7-methoxy-1-methyl-β-carboline.

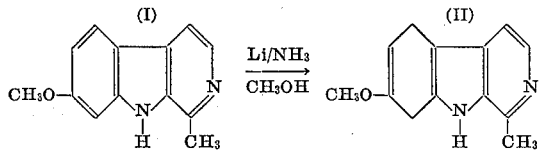

Treatment of the 5,8-dihydro-β-carbolines thus prepared with a mineral acid, such as hydrochloric acid, gives the corresponding ketotetrahydro-β-carbolines of the present invention. This preparation may be specifically illustrated by the following equation.

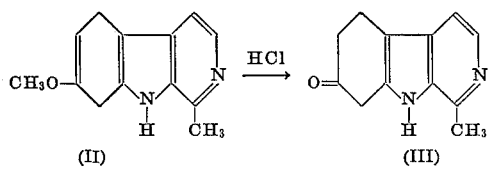

The preparation of methoxy-5,8-dihydro-β-carbolines by metal-in-ammonia reduction of the corresponding methoxy-β-carbolines represents a novel and unexpected application of this method. In general, the pyridine ring is more readily reduced than is the benzene ring. This relation holds true in the β-carbolines wherein reduction under a variety of conditions affords the 1,2,3,4-tetrahydro derivatives [Advances in Heterocyclic Chemistry, vol. 3, Ed. by A. R. Katritzky. Academic Press, New York, 1964, p. 100–103]. Catalytic reduction in acetic acid of β-carbolines gives reduction in the benzene ring, but only the 5,6,7,8-tetrahydro derivative is formed [ibid. p. 103]. Furthermore, previous investigations revealed that metal-in-ammonia reductions of heterocycles containing both benzene and pyridine rings, such as quinoline [J. Am. Chem. Soc., 65, 410 (1943)] and isoquinoline [Tetrahedron, 6, 148 (1959)], 16 148 (1959) afforded derivatives which are dihydrogenated in the pyridine ring. The results described in the present invention are in contradiction to the predictions which would follow from this prior art. There has been no previous report of the preparation of 5,8-dihydrogenated derivatives of 1,2,3,4-tetrahydro-β-carbolines, although simple indoles have been reduced to 4,7-dihydro derivatives with metal-in-ammonia systems [J. Chem. Soc., 1960, 4609]. The simple indoles gave mixtures of products, whereas in the present invention reduction of 1,2,3,4-tetrahydro-β-carbolines gives good yields of the 5,8-dihydro derivative as the sole insolable product. The present process may be carried out at a temperature of from 0° C. to 80° C., room temperature being preferred, for a period of a few minutes to several hours.

The novel keto-1-loweralkyl-5,6,7,8,-tetrahydro-β-carbolines of the present invention possess useful antidepressant activity.

The antidepressant properties make the present compounds useful as excitants or psychic energizers. The antidepressant properties are evinced by measuring their ability to counteract a depression induced in animals by the administration of tetrabenazine hexamate. Doses of 25 milligrams per kilogram of the test compounds are administered intraperitoneally to 5 mice one hour before the administration of tetrabenazine hexamate at a dose of 30 mg./kg. (intraperitoneal) which is known to depress markedly the exploratory behavior of normal mice. Thirty minutes later the mice are tested for their exploratory behavior. The antidepressant treated groups show normal exploratory behavior, while the control groups and groups treated with an ineffective antidepressant agent, do not show this normal exploratory behavior, but show the well known, profound depression induced by tetrabenazine. Administration of the test compounds to additional groups of 5 mice is repeated, the numbers of individual animals showing an antidepressant response (normal exploratory behavior) are recorded and the results are analyzed by the following scheme (statistically standardized; significant P=less than 0.05):

| No. active/(No. tested) | | Result |
|---|---|---|
| 1st stage/(5 animals) | 0/5 = | Reject (ineffective antidepressant). |
|  | 1/5–3/5 = | Continue to stage 2. |
|  | ≧4/5 = | Accept (active antidepressant). |
| 2nd stage/(5 animals) | 1/10 = | Reject. |
|  | 2/10–3/10 = | Continue to stage 3. |
|  | ≧4/10 = | Accept. |
| 3rd stage/(5 animals) | ≧3/15 = | Reject. |
|  | ≧4/15 = | Accept. |

When a given test compound is accepted by this procedure at the designated dose level, the sequential procedure is then repeated (at the same dose level) to provide unequivocal confirmation of its acceptance as an active antidepressant. The results from several dose levels (acceptance in at least two sequential test procedures) are then used to establish the Range of Active Doses. This method has been described by Greenblatt, E. N. and Osterberg, A. C. in Toxicology and Applied Pharamacology 7, pp. 566–578, (1965). The results of said testing are accurately summarized in the table below:

TABLE

Reversal of tetrabenazine depression

| Compound: | Range of active doses (mg./kg.) intraperitoneal |
|---|---|
| 7-keto - 1 - methyl-5,6,7,8-tetrahydro-β-carboline | 12.5–25 |

DETAILED DESCRIPTION

The following examples illustrate the preparation of specific β-carbolines of the present invention.

EXAMPLE 1

Preparation of 5,8-dihydro-7-methoxy-1-methyl-β-carboline (II)

A suspension of 3.49 g. of harmine (7-methoxy-1-methyl-β-carboline) in 700 ml. of liquid ammonia and 70 ml. of ether is treated with 2.0 g. of lithium. The resulting blue mixture is stirred for 1 hour and then treated dropwise with methanol until the color is discharged. After evaporation of the ammonia, the residue is treated with water and methylene chloride. The organic layer is dried and concentrated and the residual solid is purified by partition chromatography on diatomaceous earth with a methanol-heptane system. This procedure gives the desired product as white solid, melting point 218–219.5° C. This product forms with acetic acid in ether an acetate salt, melting point 175–177° C.

EXAMPLE 2

Preparation of 5,8-dihydro-6-methoxy-1-methyl-β-carboline

Treatment of 6-methoxyharman by the procedure described in Example 1, gives the above product as white solid, melting point 205–208° C. This product forms an acetate salt, melting point 195–200° C.

EXAMPLE 3

Preparation of 7-keto-1-methyl-5,6,7,8-tetrahydro-β-carboline (III)

A mixture of 100 mg. of 5,8-dihydro-7-methoxy-1-methyl-β-carboline (Example 1) and 10 ml. of 1% hydrochloric acid is stirred until a clear solution results. It is then made alkaline and extracted with methylene chloride. This extract is washed with water, dried, and concentrated, and the residue is crystallized two times from methylene chloride-hexane. This procedure gives the above product as white needles, melting point 215–218° C.

EXAMPLE 4

Preparation of 6-keto-1-methyl-5,6,7,8-tetrahydro-β-carboline

Treatment of 5,8-dihydro-6-methoxy-1-methyl-β-carboline (Example 2) by the procdure described in Example 3 gives the desired product as white solid, melting point 205°–208° C.

We claim:

1. A tetrahydro-β-carboline selected from the group consisting of those of the formula:

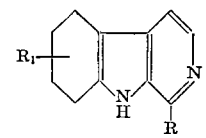

wherein R is lower alkyl and $R_1$ is the oxygen of a keto group and the non-toxic acid addition salts thereof.

2. The tetrahydro-β-carboline in accordance with claim 1, 7-keto-1-methyl-5,6,7,8-tetrahydro-β-carboline.

3. The tetrahydro-β-carboline in accordance with claim 1, 6-keto-1-methyl-5,6,7,8-tetrahydro-β-carboline.

References Cited

UNITED STATES PATENTS 3,497,507   2/1970   Freed _____ 260—247.5

OTHER REFERENCES

Kuehne: J. Am. Chem. Soc., vol. 84, pp. 837–847 (1962).

ALAN L. ROTMAN, Primary Examiner

U.S. Cl. X.R.

260—295, 999